(12) United States Patent
Holland

(10) Patent No.: US 7,194,467 B2
(45) Date of Patent: Mar. 20, 2007

(54) USING WHOLE-FILE AND DUAL-MODE LOCKS TO REDUCE LOCKING TRAFFIC IN DATA STORAGE SYSTEMS

(75) Inventor: Mark C. Holland, Pittsburgh, PA (US)

(73) Assignee: Panasas, Inc, Pittsburgh, PA (US)

( * ) Notice: Subject to any disclaimer, the term of this patent is extended or adjusted under 35 U.S.C. 154(b) by 650 days.

(21) Appl. No.: 10/371,271

(22) Filed: Feb. 21, 2003

(65) Prior Publication Data

US 2003/0187860 A1    Oct. 2, 2003

Related U.S. Application Data

(60) Provisional application No. 60/368,785, filed on Mar. 29, 2002, provisional application No. 60/372,026, filed on Apr. 12, 2002, provisional application No. 60/372,024, filed on Apr. 12, 2002.

(51) Int. Cl.
*G06F 17/30* (2006.01)
(52) U.S. Cl. .......................................... 707/8; 707/103
(58) Field of Classification Search .............. 707/1–10, 707/100–104.1, 200–206; 718/102–104; 714/6; 711/114
See application file for complete search history.

(56) References Cited

U.S. PATENT DOCUMENTS 5,950,199 A * 9/1999 Schmuck et al. .............. 707/8
6,173,293 B1 * 1/2001 Thekkath et al. ........... 707/201
6,401,170 B1 * 6/2002 Griffith et al. .............. 711/114

(Continued)

OTHER PUBLICATIONS

Frank Schmuck and Roger Haskin IBM Almaden Research Center San Jose, CA ., ("GPFS: A Shared-Disk File System for Large Computing Clusters," Proceedings of the Conference on File and Storage Technologies (FAST'02), Jan. 28-30, 2002, Monterey, CA, pp. 231-244. (USENIX, Berkeley, CA.).*

(Continued)

*Primary Examiner*—Yicun Wu
(74) *Attorney, Agent, or Firm*—Morgan Lewis & Bockius LLP

(57) ABSTRACT

A methodology wherein two different types of locks are used by a storage manager when multiple clients wish to access a particular redundantly-stored file. Simple byte-range based mutual exclusion (or mutex) locks are granted by the storage manager for data writes/updates to the file when the file is in the fault-free state, and individual readers/writers (R/W) locks are granted by the storage manager when the file is in the degraded state. No read locks are required of clients when the file object is in the fault-free state. During the fault-free state of the file object, when exactly one client is writing to the file object, the storage manger grants that file object a whole-file lock valid over the entire file object. Each client may have a client lock manager that interacts with appropriate storage manager lock manager to request and obtain necessary locks. These various locking mechanisms reduce lock-related network traffic in a data storage system.

5 Claims, 4 Drawing Sheets

U.S. PATENT DOCUMENTS 6,665,675 B1 * 12/2003 Mitaru ..................... 707/10
6,826,570 B1 * 11/2004 Eshel et al. ................. 707/8

OTHER PUBLICATIONS

Ghemawat, Sanjay; Gobioff, Howard; and Leung, Shun-Tak."The Google File System" SOSP '03, Oct. 19-22, 2003, Bolton Langding, New York, USA.*

Serverless Network File Systems Thomas E. Anderson, Michael D. Dahlin, Jeanna M. Neefe,David A. Patterson, Drew S. Roselli, and Randolph Y. Wang.*

S. Soltis, T. M. Ruwart, and M. T. O'Keefe. "The global file system." In Proc. of the Fifth NASA Goddard Conference on Mass Storage Systems and Technologies, Sep. 1996.*

\* cited by examiner

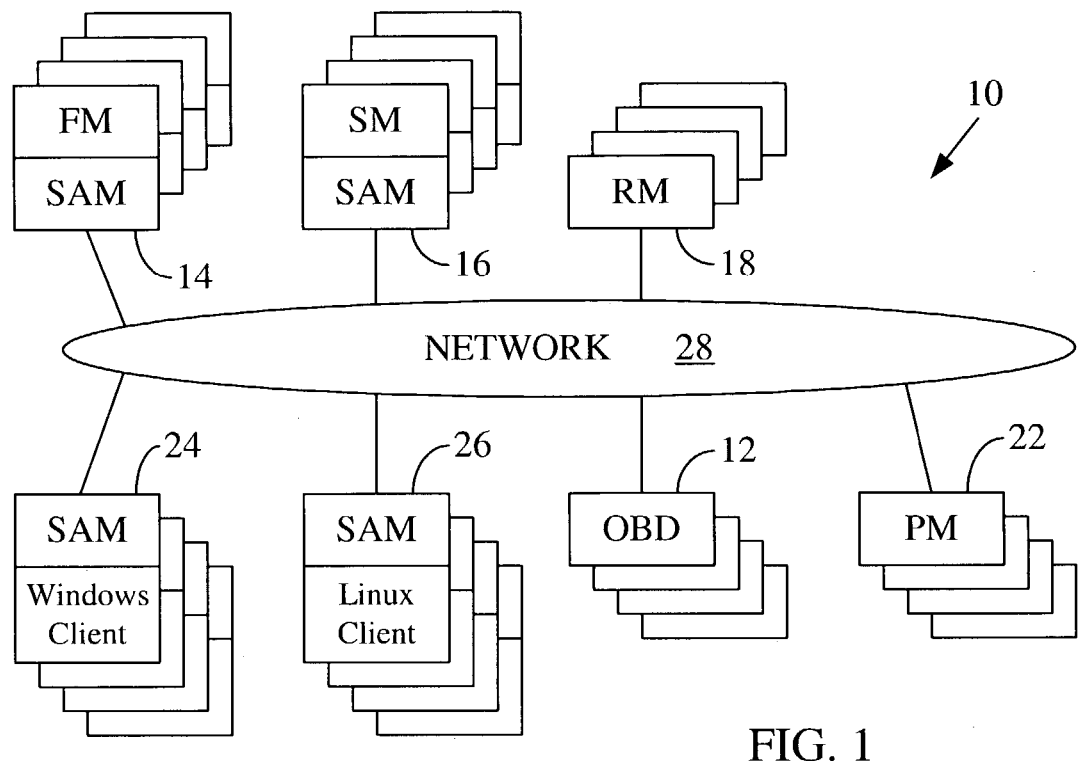
FIG. 1
FIG. 2
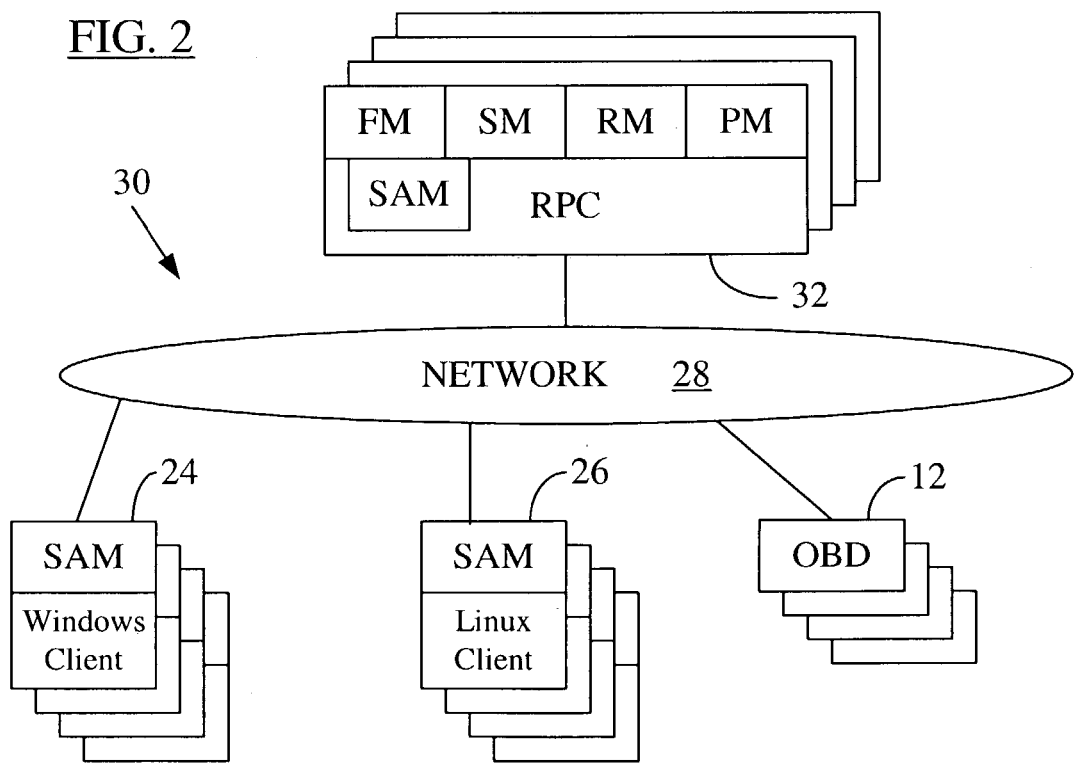

USING WHOLE-FILE AND DUAL-MODE LOCKS TO REDUCE LOCKING TRAFFIC IN DATA STORAGE SYSTEMS

REFERENCE TO RELATED APPLICATIONS

This application claims priority benefits of prior filed co-pending and commonly-owned U.S. provisional patent applications Ser. No. 60/368,785, filed on Mar. 29, 2002, Ser. No. 60/372,026, filed on Apr. 12, 2002, and Ser. No. 60/372,024, filed on Apr. 12, 2002, the disclosures of all of them are incorporated herein by reference in their entireties.

BACKGROUND

1. Field of the Invention

The present invention generally relates to data storage systems and methods, and, more particularly, to a methodology for reducing redundancy-update lock communication overhead using whole-file and dual-mode locks in a distributed object-based data storage system.

2. Description of Related Art

In a distributed data storage system, servers and client computers may interact with each other and with data storage disks or other system agents in a pre-defined manner. For example, client computers may read from or write into the storage disks various types of data including, for example, normal application-specific data or redundant information being stored for fault tolerance. Various levels of RAID (Redundant Array of Independent Disks) may be implemented for desired storage system fault tolerance configuration. In any event, whenever the regular (non-redundant) data is modified, typical fault tolerance configurations (e.g., RAID) require that the redundant data be modified as well. If multiple independent threads of control (e.g., multiple client computers) wish to simultaneously modify redundant information, they must use some sort of conflict resolution strategy (e.g., locking) to assure that their independent updates do not conflict with each other and, hence, do not corrupt the redundantly-stored information. Thus, the term "lock", as used hereinbelow, may be generally defined as a mechanism to regulate access to a file by multiple clients, wherein the file may contain non-redundant as well as redundant data.

In most data storage systems, the updating of redundant information is done under the control of exactly one computer. This arrangement reduces locking overhead because any communication it invokes is purely local to one computer. However, in modern distributed, network-based data storage architectures, locking may introduce a heavy burden of network communication between client computers and servers, which can greatly reduce system performance. For example, in some storage systems, lock-related network traffic may be present even when only one client computer is accessing a particular file. Therefore, it is desirable to reduce this lock-related traffic to the maximum extent possible in a distributed data storage system.

In some prior art data storage systems, a single type of lock would be used at all times whether the file to be accessed is in a fault-free state or in a degraded state (i.e., when the file is affected by the non-availability of one or more disks on which the data for that file is stored). In other words, such prior data storage systems do not change the locking strategy at the transition between the fault-free mode and the degraded mode. In those data storage systems, using a single locking strategy does not impose a heavy burden on the system because either (a) all operations are serially executed in a dedicated hardware controller, obviating the need for locking, or (b) all redundancy computations are performed on one computer, eliminating the need for network communication associated with lock acquisition and release. However, in certain distributed data storage architectures, such single locking strategy may not reduce lock-related network traffic and, hence, additional measures may be needed to reduce lock-related network communication overhead.

Therefore, it is desirable to devise a data storage methodology wherein the locking strategy employs different types of locks when a data-containing file transitions from a fault-free mode into a degraded mode and vice-versa. It is further desirable to minimize lock-related network traffic in the event that there is only one client computer accessing a particular file.

SUMMARY

In one embodiment, the present invention contemplates a method of updating data contained in a file object stored in an object-based distributed data storage system. The method comprises receiving a request from a first requestor in the data storage system for updating a portion of the data in the file object; upon receipt of the request, determining whether a first write lock has been granted to a second requestor in the data storage system to update any portion of the data in the file object; and in the absence of the first write lock, granting a second write lock to the first requester, wherein the second write lock is valid over entirety of the file object, thereby allowing the first requester to update any portion of the data in the file object.

In another embodiment, the present invention contemplates a method of accessing redundant data contained in a file object in an object-based distributed data storage system. The method comprises allowing each executable application operating in the data storage system to access the redundant data using a corresponding first lock only when the executable application is performing a write operation on the redundant data in the file object and so long as the file object is in a fault-free state, wherein each first lock allows a corresponding executable application to access the file object simultaneously with one or more other executable applications; and requiring each executable application to acquire a corresponding second lock or third lock over a corresponding byte range in the file object when performing a respective read or write operation on the redundant data in the file object so long as the file object is in a degraded state.

Thus, according to the present invention, two different types of locks are used by a storage manager when multiple clients wish to access a particular redundantly-stored file. Simple byte-range based mutual exclusion (or mutex) locks are granted by the storage manager for data writes/updates to the file when the file is in the fault-free state, and individual readers/writers (R/W) locks are granted by the storage manager when the file is in the degraded state. No read locks are required of clients when the file object is in the fault-free state. Furthermore, during the fault-free state of the file object, when exactly one client is writing to the file object, the storage manger grants that file object a whole-file lock valid over the entire file object. Each client may have a client lock manager that interacts with appropriate storage manager lock manager to request and obtain necessary locks. These various locking mechanisms reduce lock-related network communication overhead in a distributed, object-based data storage system without compromising fault tolerance or recovery from fault conditions.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 1 illustrates an exemplary network-based file storage system designed around Object Based Secure Disks (OBSDs or OBDs);

FIG. 2 illustrates an implementation where various managers shown individually in FIG. 1 are combined in a single binary file;

DETAILED DESCRIPTION

Figure 3:
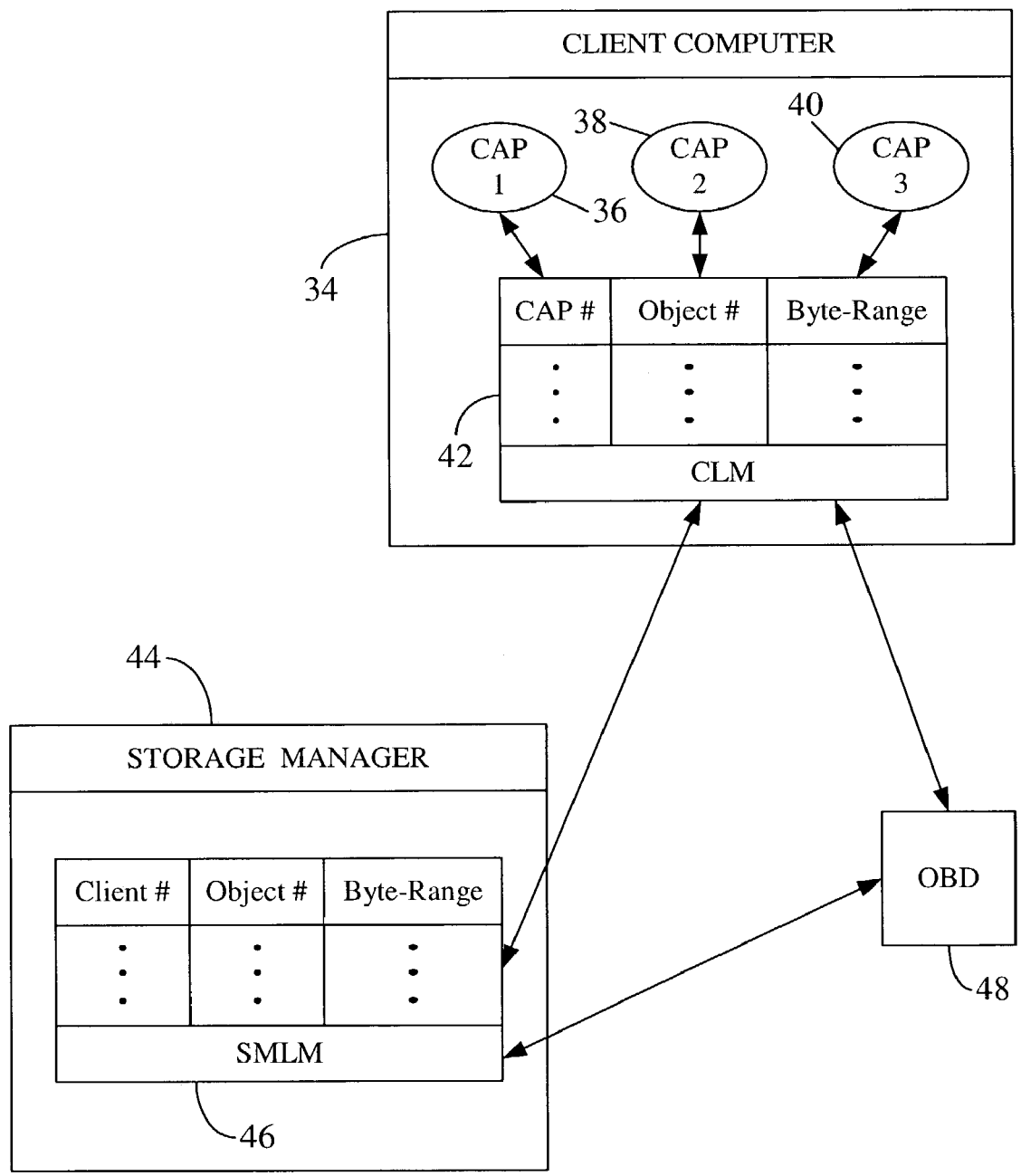
FIG. 3 illustrates an exemplary client lock manager and an exemplary storage manager lock manager that implement various locking mechanisms shown in the flowcharts in FIGS. 4 and 5.

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, Unix®, etc.) may preferably be maintained by the file system clients. The clients may run various applications including, for example, routine database applications (e.g., an Oracle®-based application), complicated scientific data processing applications, word processors (e.g., a Microsoft® Word application), etc.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In that case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges (not shown). The OBDs, clients, managers, etc., may be considered as "anodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). The authenticity determination may be capability-based, whereas the privacy and integrity portions of the security model may be implemented using network-level encryption and/or digital signing. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs.

A capability is simply a description of allowed operations. A capability may be a set of bits (1's and 0's) placed in a predetermined order. The bit configuration for a capability may specify the operations for which that capability is valid. Thus, there may be a "read capability," a "write capability," a "set-attribute capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12. A client may return the capability to the manager issuing it or discard the capability when the task associated with that capability is over.

A capability may also contain a field called the Authorization Status (AS), which can be used to revoke or temporarily disable a capability that has been granted to a client. Every object stored on an OBD may have an associated set of attributes, where the AS is also stored. Some of the major attributes for an object include: (1) a device_ID identifying, for example, the OBD storing that object and the file and storage managers managing that object; (2) an object-group_ID identifying the object group containing the object in question; and (3) an object_ID containing a number randomly generated (e.g., by a storage manager) to identify the object in question. If the AS contained in a capability does not exactly match the AS stored with the object, then the OBD may reject the access associated with that capability. A capability may be a "single-range" capability that contains a byte range over which it is valid and an expiration time. The client may be typically allowed to use a capability as many times as it likes during the lifetime of the capability. Alternatively, there may be a "valid exactly once" capability. Additional discussion about capability-based locking strategy according to the present invention is given hereinbelow with reference to FIGS. 3–5.

It is noted that in order to construct a capability (read, write, or any other type), the FM or SM may need to know the value of the AS field (the Authorization Status field) as stored in the object's attributes. If the FM or SM does not have these attributes cached from a previous operation, it will issue a GetAttr ("Get Attributes") command to the necessary OBD(s) to retrieve the attributes. The OBDs may, in response, send the attributes to the FM or SM requesting them. The FM or SM may then issue the appropriate capability.

Logically speaking, various system "agents" (i.e., the clients 24, 26, the managers 14–22, and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to objects (which allows a direct flow of data between an OBD and a client). The storage manager 16 may also determine exactly how each object will be laid out—i.e., on what OBD or OBDs that object will be stored, whether the object will be mirrored, striped, parity-protected (e.g., for fault tolerance), etc. This distinguishes a "virtual object" from a "physical object". One virtual object (e.g., a file or a directory object) may be spanned over, for example, three physical objects (i.e., OBDs).

The storage access module (SAM) is a program code module that may be compiled into the managers as well as the clients. The SAM generates and sequences the OBD-level operations necessary to implement system-level I/O (input/output) operations, for both simple and aggregate objects.

The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. A performance manager 22 may run on a server that is separate from the servers for other managers (as shown, for example, in FIG. 1) and may be responsible for monitoring the performance of the file system realm and for tuning the locations of objects in the system to improve performance. The program codes for managers typically communicate with one another via RPC (Remote Procedure Call) even if all the managers reside on the same node (as, for example, in the configuration in FIG. 2).

A further discussion of various managers shown in FIG. 1 (and FIG. 2) and their functionality is provided on pages 11–15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

FIG. 2 illustrates one implementation 30 where various managers shown individually in FIG. 1 are combined in a single binary file 32. FIG. 2 also shows the combined file available on a number of servers 32. In the embodiment shown in FIG. 2, various managers shown individually in FIG. 1 are replaced by a single manager software or executable file that can perform all the functions of each individual file manager, storage manager, etc. It is noted that all the discussion given hereinabove and later hereinbelow with reference to the file storage system 10 in FIG. 1 equally applies to the file storage system embodiment 30 illustrated in FIG. 2. Therefore, additional reference to the configuration in FIG. 2 is omitted throughout the discussion, unless necessary.

The fact that clients directly access OBDs, rather than going through a server, makes I/O operations in the object-based file systems 10, 30 different from other file systems. In one embodiment, prior to accessing any data or metadata, a client must obtain (1) the identity of the OBD on which the data resides and the object number within that OBD, and (2) a capability valid on that OBD allowing the access. Clients learn of the location of objects by directly reading and parsing directory objects located on the OBD(s) identified. Clients obtain capabilities (e.g., for updating redundant data) by sending explicit requests to storage managers 16. The client includes with each such request its authentication information as provided by the local authentication system. The SM 16 may then grant requested capabilities to the client, which can then directly access the OBD in question or a portion thereof.

Capabilities may have an expiration time, in which case clients are allowed to cache and re-use them as they see fit. Therefore, a client need not request a capability from the storage manager for each and every I/O operation. Often, a client may explicitly release a set of capabilities to the storage manager (for example, before the capabilities' expiration time) by issuing a Write Done command. There may be certain operations that clients may not be allowed to perform. In those cases, clients simply invoke the command for a restricted operation via an RPC (Remote Procedure Call) to the storage manager 16, and the responsible manager then issues the requested command to the OBD in question.

As noted before, every object stored on an OBD may have an associated set of attributes. For example, one set of values for the {device_ID, object-group_ID, object_ID} attribute triplet for an object may be {SM #3, object-group #29, object #6003 }. It is noted that, in one embodiment, each {device_ID, object-group_ID, object_ID} triplet is a set of virtual (not physical) ID's and is unique in the realm. In other words, even if two objects have the same object_ID, they cannot have the same values for the corresponding {device_ID, object-group_ID, object_ID} triplets. It is noted that other object attributes may include a value identifying the time of creation of the object, and a pointer or flag indicating whether the object is a parent object (e.g., a sub-directory object) or a child object (e.g., a file object).

At client setup time (i.e., when a client is first connected to the network 28), a utility (or discovery) program may be used to configure the client with the address of at least one realm manager 18 associated with that client. The configuration software or utility program may use default software installation utilities for a given operating system (e.g., the Windows® installers, Linux® RPM files, etc.). A client wishing to access the file storage system 10, 30 for the first time may send a message to the realm manager 18 (whose address is provided to the client) requesting the location of the root directory of the client's realm. A "Get Name Translation" command may be used by the client to request and obtain this information. The contacted RM may send the requested root directory information to the client. For example, the root information may identify that the triplet {device_ID, object-group_ID, object_ID} is {SM #3, object-group #29, object #6003}. The client may then contact the SM identified in the information received from the RM (as part of that RM's response for the request for root directory information) to begin resolving path names. The client may probably also acquire more information (e.g., the addresses of all realm managers, etc.) before it begins accessing files to/from OBDs.

After the client establishes the initial contact with the file storage system 10, 30—i.e., after the client is "recognized" by the system 10, 30—the client may initiate a data file write operation to one or more OBDs 12.

Figure 4:
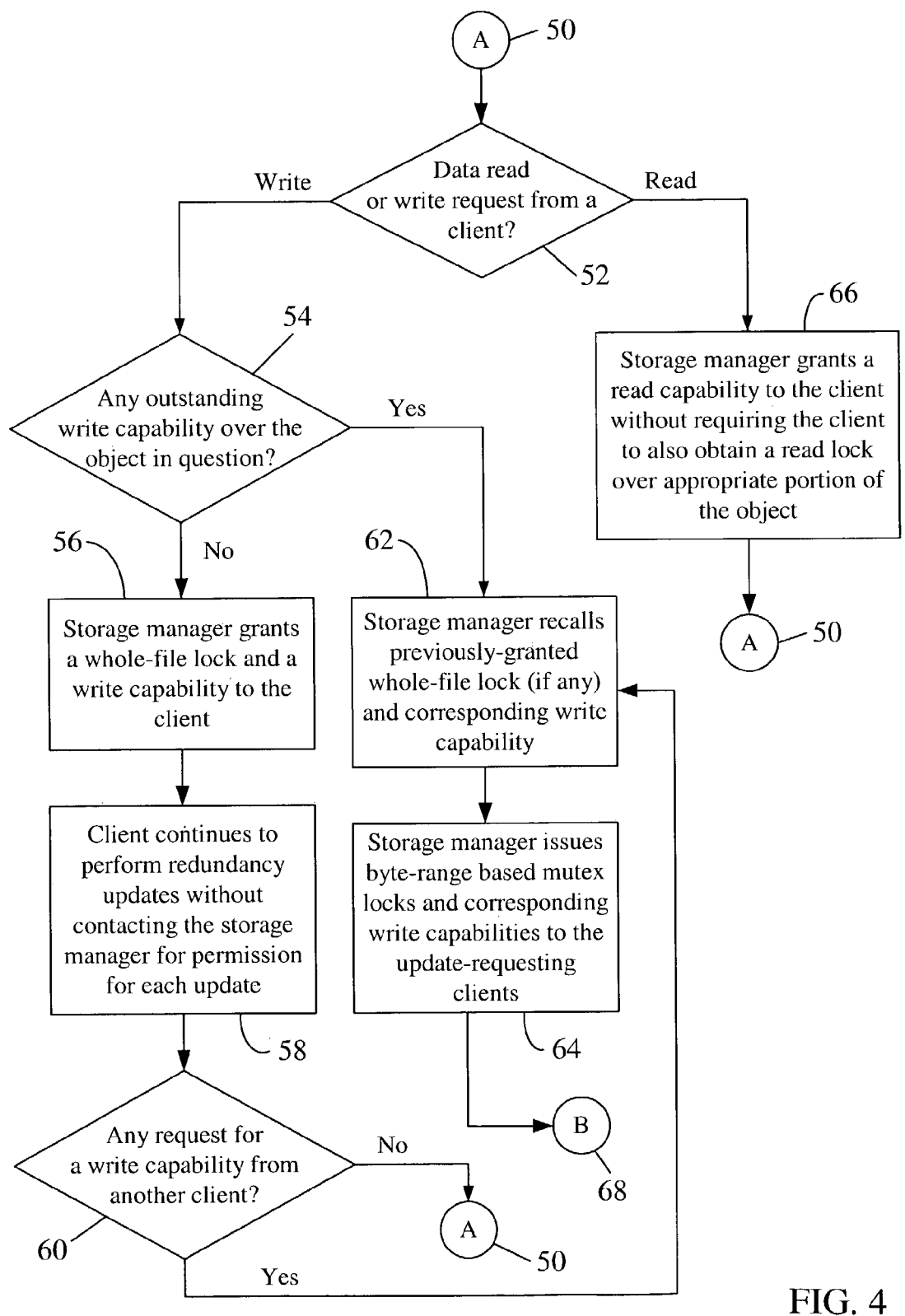
FIG. 4 shows an exemplary flowchart depicting how whole-file locks are implemented in the data storage systems of FIGS. 1 and 2 according to one embodiment of the present invention.
Figure 5:
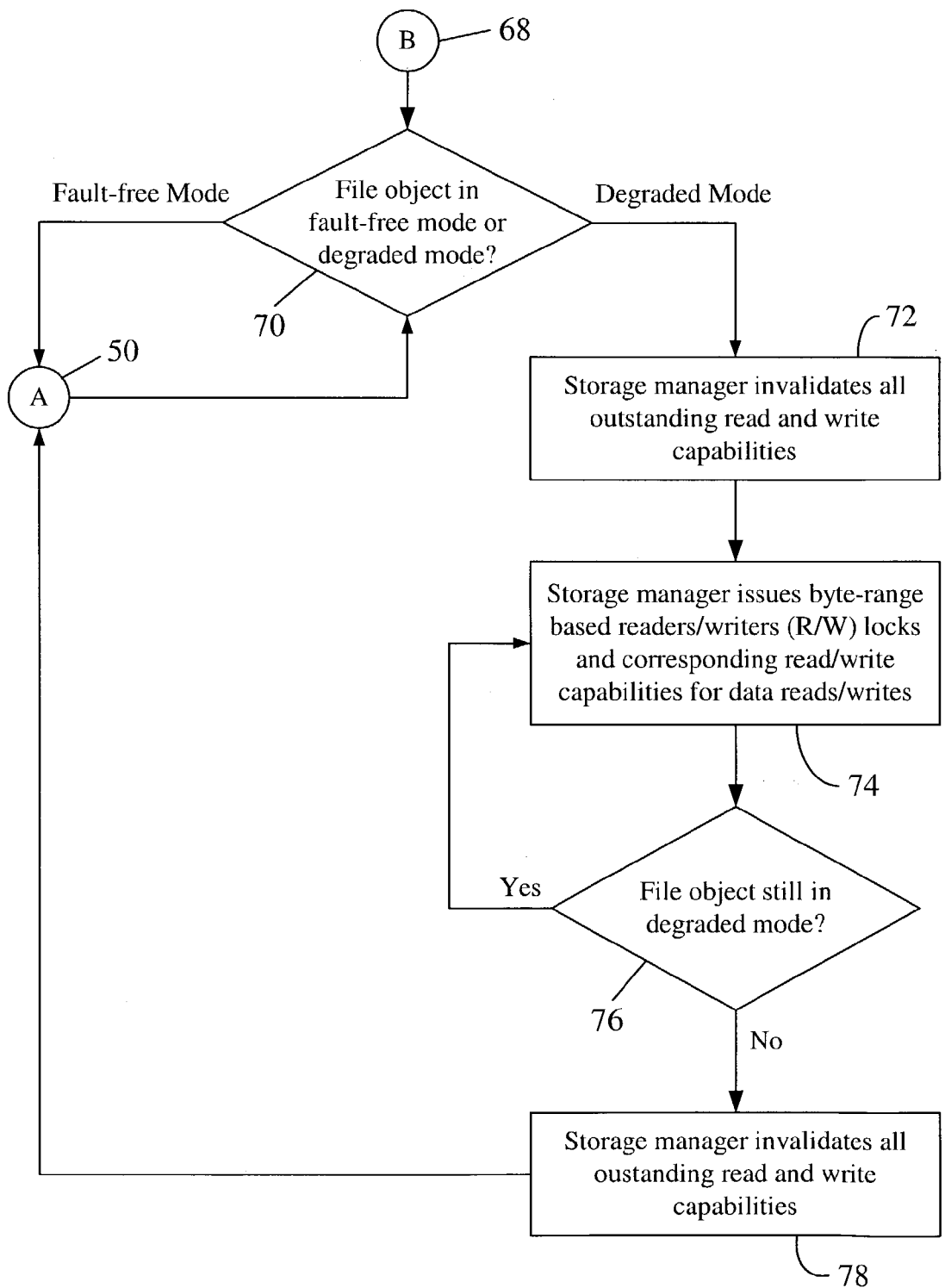
FIG. 5 depicts an exemplary flowchart showing how dual-mode locks are implemented in the data storage systems of FIGS. 1 and 2 according to one embodiment of the present invention.

FIG. 3 illustrates an exemplary client lock manager 42 and an exemplary storage manager lock manager 46 that implement various locking mechanisms shown in the flowcharts in FIGS. 4 and 5. FIG. 4 shows an exemplary flowchart depicting how whole-file locks are implemented in the data storage systems of FIGS. 1 and 2 according to one embodiment of the present invention. Various blocks shown in FIGS. 4 and 5 are discussed below with reference to the system diagram in FIG. 3.

The locking strategies illustrated in FIGS. 4 and 5 work through the interaction of three software components that may be resident on different physical computers as shown in FIG. 3. The three software components, as illustrated in FIG. 3, are: the client application program (CAP), the client lock manager (CLM), and the storage manager lock manager (SMLM). In FIG. 3, a client computer 34 (which may be a computer similar to the clients 24, 26 in FIGS. 1 and 2) is shown with three CAPs 36, 38, 40 and a CLM 42 running on it. A CAP can be any computer-executed application including, for example, a UNIX® database application, a Windows® word processing application, a scientific computation application, etc. The CLM 42 is shown with its lock table (discussed later); the CLM 42 interacts with the CAPs 36–40 and each appropriate SMLM for lock acquisition and management. In one embodiment, each client computer 24, 26 may have one CLM running on it, and each storage manager computer/server 16 may have a corresponding SMLM running on it. In FIG. 5, an exemplary storage manager computer 44 (which is similar to one of the storage managers 16 in FIGS. 1 and 2) is shown with an SMLM 46 running on it. The SMLM 46 is shown with its own lock table (discussed later). Both the client computer 34 and the storage manager computer 44 are shown interacting with each other and also with an OBD 48 (which can be one or more of the OBDs 12 in FIGS. 1 and 2). As the CLM 42 and the SMLM 46 are resident on separate physical computers, they communicate with each other (and also with the OBD 48) over the network 28 using a network connection.

It is noted that although CLM 42 and SMLM 46 are shown as separate software entities resident on the client computer 34 and the storage manager 44, respectively, the CLM 42 and SMLM 46 may be integral to the respective client and storage manager software code. In that case, the lock manager functionality may be an integral part of the respective client and storage manager software. In one embodiment, both the CLM 42 and the SMLM 46 are part of the code for respective client and storage manager SAMs. It is also pointed out that the discussion given hereinbelow uses the terms "SMLM" and "SM or storage manager" as well as the terms "CLM" and "client" interchangeably because the focus here is on the ultimate lock manager functionality (which is performed by the corresponding storage manager or client computer) and it may not be critical to identify which specific component or part in the storage manager or client computer is performing that functionality.

As noted, each of the CLM 42 and the SMLM 46 may internally maintain a corresponding lock table to manage lock-related transactions. FIG. 3 illustrates some exemplary columns for the CLM and SMLM lock tables. Although both of these lock tables may have similar content, it is noted, however, that these lock tables may not have all identical entries as is evident from the different column headings for respective lock tables in CLM 42 and SMLM 46. In one embodiment, the lock table maintained by the CLM 42 may contain a record of the identity of the CAP (the CAP# column in FIG. 3) that has been granted a lock, the object_ID (the object # column in FIG. 3) of the object being accessed by the CAP, and the byte-range over which the lock has been granted to the CAP. Although not shown in FIG. 3, some additional information in the CLM lock table may include, per entry, an indication whether the corresponding lock is held active or inactive (as discussed below) and whether the lock is for a data read operation or a data write operation. Thus, generally speaking, the lock table in the CLM 42 is specific to the CAPs running on the respective client computer 34.

On the other hand, the lock table maintained by the SMLM 46 may contain a system-wide record of all locks granted to various clients in the system 10. In other words, the lock table in the SMLM 46 is client-specific (not CAP-specific) and the SMLM 46 may not have knowledge of internal client operations, i.e., which specific CAP in a client is requesting a particular lock. The SMLM 46 may "see" a lock request as a request coming only from a specific client irrespective of internal client software architecture. In one embodiment, the lock table maintained by the SMLM 46 may contain a record of the identity of the client (the client # column in FIG. 3) has been granted a lock, the object_ID (the object # column in FIG. 3) of the object being accessed by the client, and the byte-range over which the lock has been granted to the client. Although not shown in FIG. 3, the lock table in the SMLM 46 may also include an indication, per entry, whether the corresponding object is in a fault-free state or in a degraded state (discussed later hereinbelow) and whether a write or read capability is granted to a client or whether the lock is for a data read operation or a data write operation. Such information about the fault-free/degraded state of an object or capability grant status may be readily available at each SM in the system 10.

The SMLM 46 may communicate directly with the CLM 42 over the network 28. When the SMLM 46 decides to grant a lock requested by the CLM 42 (as described later), it may issue the requested lock to the CLM 42 directly, which, in turn, may decide whether to allow a specific CAP 36–40 to obtain the entire lock received from the SMLM 46 or to internally divide the lock into "sub-locks" so that the byte-range associated with the original lock can be divided into non-overlapping "sub-byte-ranges" for sub-locks and then to distribute the sub-byte-ranges among two or more CAPs 36–40.

A lock in the CLM's lock table may be held "active," i.e., the lock is currently held by the client 34 and some CAP 36–40 is actively using the lock; or, the lock may be held "inactive," i.e., the lock is currently held by the client 34 but no CAP 36–40 is actively using the lock. When a CAP 36–40 wishes to access a data file object to perform a data read or write operation, the CAP contacts its local CLM 42 to request a byte-range-based read (R) or write (W) lock on the object in question. In one embodiment, the CAP ignores whether it should request a mutex lock (described later hereinbelow) or a simple R/W (readers/writers) lock. The CAP simply requests an R lock (for data reading) or a W lock (for data writing) as defined, for example, by its operating system interface (e.g., the Unix® file system interface or the Windows® file system interface)—the operating system interface allows the CAP to request a read lock or a write lock against a specific file object. Upon receiving the lock request from a CAP 36–40, the CLM 42 scans its lock table. If the lock request is for an R lock and the CLM 42 believes that the object being locked is in the locally held state (whether held "active" or held "inactive"), the CLM 42 may immediately grant the requested lock and mark the lock as "granted". Otherwise, if a held-inactive lock "subsumes" the requested lock (i.e., if the requested lock's byte-range falls under the byte-range allocated to the held-inactive lock), then the CLM 42 grants the requested lock and marks the lock as held "active" of the appropriate type (R or W lock). On the other hand, if a held-active lock subsumes the requested lock, the CLM 42 may delay the lock grant until the held-active lock is locally released. If no held lock (whether held "active" or "inactive") subsumes the requested lock, the CLM 42 may issue a network request to the SMLM 46 for the needed lock and delay the lock grant to the lock-requesting CAP 36–40 until the CLM 42 receives the authorization or grant from the SMLM 46.

A capability and/or lock request from a client (i.e., from the CLM in the client) may include a number of message fields conveying information necessary for the SMLM to grant an appropriate capability and/or lock. Some of those fields include an object_ID (virtual) field, an object-group_ID (virtual) field, a device_ID (virtual) field, a read/write field (indicating whether the capability or lock request is for a data read or a data write operation), and a byte-range field (identifying the byte-range in the object where the client wishes to access data—for data read or write operation).

Referring now to FIG. 4, the starting point of lock request and handling by a storage manager is given by circled letter "A" (reference numeral 50). It is assumed that the data file object that a client wishes to access (for example, for updating redundant data stored in that file object) is in a fault-free state. That is, all OBDs 12 storing the file object are available and accessible to the client. The embodiment illustrated in FIG. 5 shows a locking strategy in the event that the file object is in a degraded state as discussed in more detail later. The embodiment shown in FIG. 4 reduces lock-related network communication overhead by avoiding the need for network traffic associated with locks when only one client computer is accessing a particular file object as discussed below.

The lock request from the CLM 42 may be either to read data or to write data as depicted at the decision block 52 in FIG. 4. If the lock request is to write or update data (e.g., updating redundancy data) into a given file object, the SMLM 46 first examines its lock table (or any other similar place) of outstanding capabilities over the object in question as indicated at decision block 54 in FIG. 4. In one embodiment, if no other client 24, 26 has any form of write capability over the object in question, the SMLM 46 grants the client 34 (i.e., the CLM 42 in the client 34) a redundancy-update lock valid over the entire file object (rather than the byte-range in question, as initially requested by the CLM 42) and an associated write capability to the client 34 to carryout the desired data write operation (block 56). A redundancy-update lock is a lock to synchronize updates to redundant data to assure that independent updates (by individual clients) do not conflict with each other. It is noted here that a client may always require to have a valid capability to perform a desired data operation (read or write). On the other hand, the client may not always need a lock or be required to obtain a lock, especially for certain data read operations as discussed hereinbelow with reference to block 66 in FIG. 4.

The whole-file lock granted to the client 34 remains valid over the entire file object in question. Thus, the client 34 (i.e., any CAP 36–40 running on the client 34) may continue to perform redundancy updates to the file data on the OBD 48 without contacting the SM 44 for permission (i.e., a capability and a lock) for each update. The client 34 may not need to re-contact SMLM 46 if it wishes to write to some other portion of the file, because the whole-file lock is valid over the entire file. A whole-file lock may be desirable when it is far more common in the system 10 that only one client may be writing any particular file at any one time. Thus, although occasional write-sharing of files may occur, it may still be desirable to reduce the lock-related network traffic by avoiding the need for additional locks when only one client is accessing a particular file. Thus, the first client to request a write lock on a file is optimistically granted a whole-file lock by the relevant storage manager. In the normal case, that may be the only client requesting such a lock, and, hence, no more locking-related network traffic will pass between the client and the SMLM until the lock is released or expires (e.g., along with its associated capability). To further reduce the network traffic, the client may combine its initial lock acquisition request with its initial request for one or more capabilities (read or write). The client may also combine its final lock release message with its release of one or more capabilities (read or write). Thus, considering the locking mechanism in isolation, it may invoke no extra network traffic at all in the normal case.

When write-sharing occurs, i.e., when a request (from another client computer) for a write capability arrives at the SMLM 46 while a whole-file lock is outstanding on some other client (here, the client 34 in FIG. 3), the storage manager 44 recalls the previously-granted whole-file lock and corresponding write capability as indicated by blocks 60 and 62 in FIG. 4. Such a recall operation may invoke extra network traffic, but that may be a less common case than the normal case of only one client requesting redundancy updates. Once the whole-file lock has been recalled, the SMLM 46 issues byte-range based mutex (mutual exclusion) locks and corresponding byte-range limited write capabilities to the file update-requesting clients (block 64) so that the clients can write-share the file. A mutex lock allows only one requester to have a data write access over a specific byte-range in the file. In one embodiment, however, if two clients wish to write data over a common byte-range, the SMLM 46 may prevent the mutually conflicting writes by granting the mutex locks in a FIFO (first in, first out) order, thus assuring that the write requests are serviced in the order in which they arrived. In other words, the later-arriving write lock request may not be granted until the current mutex lock is released or expires.

In the write-sharing situation, the SMLM 46 continues to grant mutex locks to all lock-requesting clients until the number of clients holding the locks goes to zero. At this point, the SMLM 46 may purge its lock table records, so that when the next request for a lock arrives, the SMLM 46 will again optimistically grant a whole-file lock as illustrated by the process path comprising the circled letter "B" (reference numeral 68 in FIGS. 4 and 5), the decision block 70 (in FIG. 5) and the circled letter "A" (reference numeral 50 in FIGS. 4 and 5).

As shown in FIG. 4, if there is no other client requesting a write capability to perform a data write operation on the file object in question, the client 34 with the whole-file lock continues to control the data writes to the entire file as indicated by the process path comprising the decision block 60 and the circled letter "A" (reference numeral 50) in FIG. 4.

Thus, as can be seen from above, it may be very easy for the SMLM 46 to determine (e.g., from its lock table entries) the points in time where there is exactly one client computer writing to any particular file. The detection of this condition by a centralized access-control mechanism (e.g., an SMLM) and the exploitation of this condition by granting a whole-file lock (rather than a byte-range based lock) to this client can substantially reduce lock- and capability-related network communication.

Referring again to FIG. 4, there may be situations where one or more client applications may wish to read data over specific byte-ranges. These data read operations may arise either in the absence of any write operations over the same or different byte ranges in the file object or during the presence of an on-going write operation over the same or different byte ranges in the file object, as broadly indicated by the decision block 52 in FIG. 4. In the distributed object-based data storage systems of FIGS. 1 and 2, so long as the file object in question is in a fault-free state, there may be no reason for a client applications to take read locks over the data ranges in the file object that they wish to read. This is because, for example, if a client B is performing an unsynchronized write to data being read by another client A in the system 10, the client A can receive old data, new data, or any mixture of the old and the new data. Thus, so long as the file object being read is in a fault-free state (i.e., when the file is not affected by the non-availability of one or more disks on which the file data are stored), such concurrent reads may not pose any data integrity or data access conflict problems. In that event, it may be desirable to reduce network communication overhead by avoiding the need for clients to obtain read locks when the system is in the fault-free state.

Thus, the CLM 42 may be configured not to request any read lock from the SMLM 46 even if the local CAP 36–40 requests such a read lock internally to the CLM 42. The CLM 42 may simply locally grant the read "lock" (i.e., "authorize" the read operation) to the lock-requesting CAP 36–40 without communicating with the SMLM 46 for the lock (i.e., requesting only a read capability without also requesting a read lock from the SMLM 46). In other words, client-internal read lock grants may be transparent to the SMLM 46 so long as the file system is in the fault-free state. When a fault condition arises, the CLM 42 may be informed of the fault condition (as discussed later hereinbelow) and, hence, may be required to contact SMLM 46 for read (and write) locks along with corresponding capability requests.

Hence, as depicted by one process path comprising the block 66 and the circled letter "A" (reference numeral 50) in FIG. 4, and also by the other path comprising the circled letter "B" (reference numeral 68), the decision block 70, and the circled letter "A" (reference numeral 50) in FIG. 5, the storage manager continues to grant read capabilities to clients without requiring the clients to also obtain corresponding read locks over appropriate portions of a file object so long as that file object is in the fault-free mode. Thus, although only one client can write data over a specific byte-range in the file object, many clients can read data from the same (or other) byte-range in the file object so long as the file object is in the fault-free mode. It is noted that, in one embodiment, the clients may not distinguish between a mutex lock or a write (W) lock while requesting the lock for a data write operation. However, the SMLM issuing the lock may prefer to grant only one type of locks—the byte-range based mutex locks—to the clients so long as the file object is in the fault-free mode. That situation may change when the file object is in the degraded mode as discussed below with reference to FIG. 5. In one embodiment, there may be a hierarchy of locks. For example, a mutex lock may be considered more powerful than an R (read) or a W (write) lock (i.e., the mutex lock may subsume an R or a W lock), and a W lock may be considered more powerful than an R lock (i.e., a W lock may subsume an R lock), etc. In such a hierarchy of locks, if a lock manager (e.g., the CLM 42) has a more powerful lock in a locally held state (held "active" or "inactive") and if it receives a request (e.g., from a CAP 36–40) for a weaker lock in the hierarchy, then the CLM 42 may be configured to grant the weaker lock without contacting the SMLM 46 so long as it has a more powerful lock locally held.

FIG. 5 depicts an exemplary flowchart showing how dual-mode locks are implemented in the data storage systems of FIGS. 1 and 2 according to one embodiment of the present invention. As discussed before with reference to FIG. 4, the storage manager issues either a whole-file lock or range-based locks (range-based mutex locks) to clients when the file object in question is in a fault-free state, and does not require the clients to obtain read locks during the fault-free state of the file object. However, when the file is in the degraded state (i.e., when the file is affected by the non-availability of one or more OBDs on which its data are stored), the storage manager locking strategy may change. A degraded mode or degraded state may generally be defined as a disk failure mode that involves fewer disks (OBDs) failing than the fault tolerance mechanism in the system 10 can tolerate. For example, if the fault-tolerance scheme (e.g., RAID) can tolerate one disk failure, then the degraded mode occurs when one disk (but no more than one disk) fails; if the fault-tolerance scheme can tolerate two disk failures, then the degraded mode occurs when either one or two disks (but not more than two) have failed; etc.

As discussed before, in a fault-free state, there may be no reason for a client application to take read locks. However, in the presence of a failed disk (degraded mode), clients must sometimes read unrelated data in an appropriate order so as to be able to reconstruct the data that was lost by the disk failure. Such ordering may be necessary as, for example, in certain RAID configurations. In that event, read locks may be necessary to guarantee that no other client B is writing this unrelated data while it is being read by client A for the purpose of reconstructing the lost information. Thus, it may be desirable to switch the locking strategy at the transition between the fault-free and degraded modes. However, it may be possible that many clients may be simultaneously reading a block of data at the moment that the transition is made between the fault-free mode and the degraded mode. Since these clients have not acquired read locks from the SMLM, it may not be possible to identify which clients are currently reading this data, and therefore, it may not be possible to know which locks (if any) need to be recalled. However, as discussed earlier, a read (or write) capability is always required before any data can be read (or written) and any issued capability can be immediately revoked by changing certain information on an OBD (e.g., the OBD that has failed) itself. Therefore, to prevent out-of-order data reads and also to maintain synchronized data reads/writes during recovery from disk failures, the SMLM 46 may first invalidate all outstanding read and write capabilities for the file object in question by changing (on the failing OBD), for example, an attribute of the object itself (e.g., the AS (authorization status) field) as indicated by block 72 in FIG. 5.

Therefore, by changing an attribute of the file object in question, the SMLM 46 can effectively and efficiently prohibit all clients from reading (or writing) the object in question. Thus, at the transition from the fault-free mode into the degraded mode (and vice versa as indicated by block 78 in FIG. 5), the storage manager 44 can force all clients to return to it to acquire new read/write capabilities. At the time of issuing new capabilities, the SM 44 will inform the clients of the mode change, and, in turn, the clients will start acquiring individual read/write locks (as discussed below) on the object in question, resulting in a cleanly-effected mode transition.

After effecting the mode transition, the SMLM 46 continues issuing byte-range based readers/writers (R/W) locks and corresponding read/write capabilities for data reads/writes as indicated at block 74 in FIG. 5. Thus, so long as the file object is in the degraded mode (as shown by the decision block 76 in FIG. 5), clients' requests for access to the data in the file object are guarded by byte-range based readers/writers locks, taken for both client reads as well as client writes. In other words, upon notification of the transition of the file object into the degraded mode, the CLM 42 will contact the SMLM 46 and request a W lock or an R lock for each corresponding data write and read operation. The SMLM 46, in turn, will grant the requested R or W locks to the client 34. It is noted that, in the degraded state, the readers/writers locks may still allow any number of clients to simultaneously read a byte-range in question so long as there is no write operation being performed on that byte-range. Any write request may have to wait until all current reads are retired or released. Thus, in a degraded state, more than one read lock can be granted on a byte-range in the file object, but only one write lock would be granted (in a manner that does not result in simultaneous reads and writes).

In one embodiment, at the transition from the degraded mode into the fault-free mode, the storage manager 44 again invalidates all outstanding read and write capabilities, thereby forcing all clients to again return to a central agent (i.e., the storage manager 44) for new capabilities and appropriate new write locks (because no read locks are required in the fault-free state), as indicated by the process path comprising the decision block 76, the block 78, the circled letter "A" (reference numeral 50) and the decision block 70 in FIG. 5. As before, the clients may be informed of the mode change at the time of issue of new capabilities.

It is noted that various managers (e.g., file managers 14, storage managers 16, etc.) shown and described with reference to FIG. 1, and the program code implemented to operate the system 10 in FIG. 1 may reside on a computer-readable, tangible storage medium (e.g., a compact disc, an optical disc, a magnetic storage medium such as a computer hard drive ,etc.) allowing ease of software portability and system management. The program code on the storage medium can be executed by a computer system processor and upon execution, the program code may cause the processor to perform various operations (including, for example, the storage manager lock manager operation) described hereinabove with reference to individual components (e.g., managers) constituting the program code. Similarly, a client application (e.g., any of the client applications, including the client lock manager application, in client computers 24, 26 in FIG. 1) can also be stored on a computer-readable data storage medium and executed therefrom.

The foregoing describes a methodology wherein two different types of locks are used by a storage manager when multiple clients wish to access a particular redundantly-stored file. Simple byte-range based mutual exclusion (or mutex) locks are granted by the storage manager for data writes/updates to the file when the file is in the fault-free state, and individual readers/writers (R/W) locks are granted by the storage manager when the file is in the degraded state. No read locks are required of clients when the file object is in the fault-free state. Furthermore, during the fault-free state of the file object, when exactly one client is writing to the file object, the storage manger grants that file object a whole-file lock valid over the entire file object even if the client requested a byte-range based lock to perform the data write/update operation. Each client may have a client lock manager that interacts with appropriate storage manager lock manager to request and obtain necessary locks. These various locking mechanisms reduce lock-related network communication overhead in a distributed, object-based data storage system without compromising fault tolerance or recovery from fault conditions.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of accessing data contained in a file object that is at least partially
   stored in an object-based secure disk (OBD) in an object-based distributed data storage system, said method comprising:
   allowing one or more executable applications operating in said data storage system to access said data using a corresponding mutual-exclusion (mutex) lock only when each said executable application is performing a write operation on said data in said file object and so long as said file object is in a fault-free state, wherein each said mutex lock allows a corresponding executable application to access said file object simultaneously with one or more other executable applications;
   further allowing each said executable application to perform a read operation on said data without using a corresponding read lock so long as said file object is in said fault-free state;
   invalidating all read capabilities and write capabilities granted to said one or more executable applications to perform said read and write operations respectively when said file object transitions from said fault-free state into a degraded state; and
   requiring each said executable application to acquire a corresponding read lock or write lock over a corresponding byte range of said data in said file object when performing a respective read or write operation on said data in said file object so long as said file object is in said degraded state.

2. The method of claim 1, further comprising invalidating all read capabilities and write capabilities granted to said one or more executable applications to perform said read and write operations respectively when said file object transitions from said degraded state into said fault-free state.

3. A method of accessing redundant data contained in a file object in an object-based distributed data storage system, said method comprising:
   allowing each executable application operating in said data storage system to access said redundant data using a corresponding first lock only when said executable application is performing a write operation on said redundant data in said file object and so long as said file object is in a fault-free state, wherein each said first lock allows a corresponding executable application to access said file object simultaneously with one or more other executable applications; and
   requiring each said executable application to acquire a corresponding second lock or third lock over a corresponding byte range in said file object when performing a respective read or write operation on said redundant data in said file object so long as said file object is in a degraded state.

4. An object-based data storage system comprising:
   means for allowing one or more executable applications operating in said data storage system to access data contained in a file object stored in said data storage system using a corresponding mutual-exclusion (mutex) lock only when each said executable application is performing a write operation on said data in said file object and so long as said file object is in a fault-free state, wherein each said mutex lock allows a corresponding executable application to access said file object simultaneously with one or more other executable applications;

means for allowing each said executable application to perform a read operation on said data without using a corresponding read lock therefor so long as said file object is in said fault-free state; and means for requiring each said executable application to acquire a corresponding read lock or write lock over a corresponding byte range of said data in said file object when performing a respective read or write operation on said data in said file object so long as said file object is in a degraded state.

5. A method of accessing a file object stored in an object-based data storage system, said method comprising:

determining whether said file object is in a fault-free state or a degraded state;

performing the following if said file object is in said fault-free state:

granting a client computer a whole-file lock valid over entirety of said file object when said client computer is the only client computer in said data storage system writing to said file object, granting a byte-range based mutual-exclusion lock to each client computer wishing to write to said file object in said data storage system when more than one client computer wishes to write to said file object, and allowing each client computer in said data storage system to read said file object without requiring a corresponding read lock therefor; and performing the following if said file object is in said degraded state:

requiring each client computer in said data storage system to obtain a corresponding byte-range based read lock or write lock on said file object for a respective data read or data write operation on said file object, and granting each client computer said corresponding byte-range based read or write lock on said file object.

* * * * *